US 9,276,988 B2

(12) United States Patent
Park (10) Patent No.: US 9,276,988 B2
(45) Date of Patent: Mar. 1, 2016

(54) APPARATUS AND METHOD FOR EXCHANGING DATA BETWEEN AUTOMOBILE HEAD UNIT AND MOBILE DEVICE

(75) Inventor: Ho-Yeon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 13/440,468

(22) Filed: Apr. 5, 2012

(65) Prior Publication Data

US 2012/0259947 A1 Oct. 11, 2012

(30) Foreign Application Priority Data

Apr. 5, 2011 (KR) .................. 10-2011-0031424
Apr. 22, 2011 (KR) .................. 10-2011-0038066

(51) Int. Cl.
*G06F 15/16* (2006.01)
*H04L 29/08* (2006.01)
*H04W 4/04* (2009.01)

(52) U.S. Cl.
CPC ............... *H04L 67/02* (2013.01); *H04L 67/16* (2013.01); *H04W 4/046* (2013.01)

(58) Field of Classification Search
CPC ........ H04L 67/02; H04L 67/16; H04W 4/046
USPC ........................ 709/203, 217, 219
See application file for complete search history.

(56) References Cited

U.S. PATENT DOCUMENTS

| 2002/0029256 A1* | 3/2002 | Zintel et al. .................. 709/218 |
| 2005/0144070 A1 | 6/2005 | Cheshire |
| 2007/0192512 A1 | 8/2007 | Kwon et al. |
| 2009/0132731 A1 | 5/2009 | Nakamura |
| 2010/0219976 A1 | 9/2010 | Park et al. |
| 2011/0093136 A1* | 4/2011 | Moinzadeh et al. .............. 701/2 |
| 2011/0289186 A1* | 11/2011 | Bell et al. ..................... 709/217 |
| 2012/0169590 A1 | 7/2012 | Sakao et al. |

FOREIGN PATENT DOCUMENTS

| JP | 2003-330824 | 11/2003 |
| JP | 2005-236560 | 9/2005 |
| JP | 2009-122945 | 6/2009 |
| JP | 2009-187533 | 8/2009 |
| KR | 1020020010287 | 2/2002 |
| KR | 1020020029029 | 4/2002 |
| KR | 1020070082016 | 8/2007 |
| KR | 1020080000649 | 1/2008 |
| WO | WO 02/11009 | 2/2002 |
| WO | WO 03/098960 | 11/2003 |
| WO | WO 2006/116026 | 11/2006 |

OTHER PUBLICATIONS

Japanese Office Action dated Jan. 4, 2016 issued in counerpart application No. 2014-503604, 6 pages.

* cited by examiner

*Primary Examiner* — Hee Soo Kim (74) *Attorney, Agent, or Firm* — The Farrell Law Firm, P.C.

(57) ABSTRACT

A unified data exchange method between an automobile head unit and a mobile device is provided, in which the automobile head unit directly provides a web user interface to the mobile device or drives a mobile application of the mobile device to provide a user interface when the automobile head unit does not provide the web user interface. Further, in the data exchange method, a user interface is dynamically provided from a third user interface server connected to the mobile device.

29 Claims, 7 Drawing Sheets

APPARATUS AND METHOD FOR EXCHANGING DATA BETWEEN AUTOMOBILE HEAD UNIT AND MOBILE DEVICE

PRIORITY

This application claims priority under 35 U.S.C. §119(a) to Korean Patent Applications filed in the Korean Industrial Property Office on Apr. 5, 2011 and Apr. 22, 2011 and assigned Serial Nos. 10-2011-0031424 and 10-2011-0038066, respectively, the content of which are incorporated herein by reference.

BACKGROUND OF THE INVENTION

1. Field of the Invention

The present invention generally relates to an apparatus and a method of data exchange, and more particularly to an apparatus and a method for exchanging data between an automobile head unit and a mobile device for infotainment.

2. Description of the Related Art

An automobile has been recognized as a space for enjoying various types of entertainment by a user, being simply a driving vehicle. As such, the development of infotainment enabling the user to receive information or enjoy various media including music and videos through the interworking with a mobile device within an automobile has been initiated.

A system of providing infotainment is used for providing a user with information, and the information is typically provided to a user in one of an audible form, a visual form, or a combination of audible and visual forms. The interaction between a mobile device within an automobile and an automobile head unit may improve user's convenience.

As described above, the interaction between the mobile device and the automobile head unit provides information in response to a specific demand of a user, so that the user's convenience may be improved. However, in an information providing means or method, different types of applications, such as a web application and a native application, are only executed based on a pre-regulated data exchange method, such as HTTP communication and TCP/IP socket communication, between the mobile device and the automobile head unit.

Accordingly, it is necessary to provide a unified communication scheme, by which various types of applications can be used together during communication between a mobile device within an automobile and an automobile head unit.

SUMMARY OF THE INVENTION

Accordingly, the present invention has been made to solve the above-stated problems occurring in the prior art, and the present invention provides an apparatus and a method of providing a unified communication scheme for use in various types of applications during communication between different devices.

Also, the present invention provides an apparatus and a method for exchanging data between different devices, which provides various types of information in response to a specific demand of a user, thereby improving the user's convenience.

Further, the present invention provides an apparatus and a method for exchanging data between an automobile head unit and a mobile device for infotainment.

Furthermore, the present invention provides an apparatus and a method for using different user interfaces together in devices communicating with each other.

In accordance with an aspect of the present invention, a method for exchanging data with a control device by a control point device is provided. The method includes making a request for a service list to the control device when the control device is discovered, receiving the service list including information on whether a web application for at least one service is provided from the control device, when a service in the service list is selected, determining whether the control device is capable of providing a web application for the selected service, when the control device is capable of providing a web application for the selected service, making a request for the web application for the selected service to the control device through a web browser, and executing the web application received from the control device.

In accordance with another aspect of the present invention, a control point device for exchanging data with a control device is provided. The control point device includes a UPnP stack for discovering a neighboring control device, making a request for a service list to the control device when the neighboring control device is discovered, and receiving the service list including information on whether a web application for at least one service is provided from the control device, and a web browser for receiving the service list from the UPnP stack, determining if the web application for the at least one service selected in the service list can be provided, making a request for the web application for the selected service to the control device, and executing the web application received from the control device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Various embodiments of the present invention will be described with reference to the drawings in detail. Various specific definitions found in the following description are provided only to help the general understanding of the present invention, and it will be understood by those skilled in the art that various changes and modifications can be made thereto within the technical spirit and scope of the present invention. In the following description, a detailed explanation of known related functions and constructions may be omitted to avoid unnecessarily obscuring the subject matter of the present invention.

The present invention provides a unified data exchange method between an automobile head unit and a mobile device. In an embodiment of the present invention, an automobile head unit directly provides a mobile device with a web user interface, or executes a mobile application of a mobile device and provides the mobile device with a user interface when the automobile head unit does not provide a web user interface, based on the unified data exchange method. In another embodiment of the present invention, a third user interface server connected to a mobile device dynamically provides a user interface based on the unified data exchange method.

Accordingly, the mobile device may communicate with the automobile head unit through the web browser or through a mobile application stored in the mobile device. According to the present invention, when the mobile device communicates with the automobile head unit, a user may simultaneously use a control user interface provided by an automobile manufacturer and a mobile application control user interface provided by a mobile device manufacturer. Accordingly, a user riding in the automobile may receive infotainment suitable to a specific demand of the user through the mobile device or the automobile head unit and enjoy the received infotainment.

Figure 1:
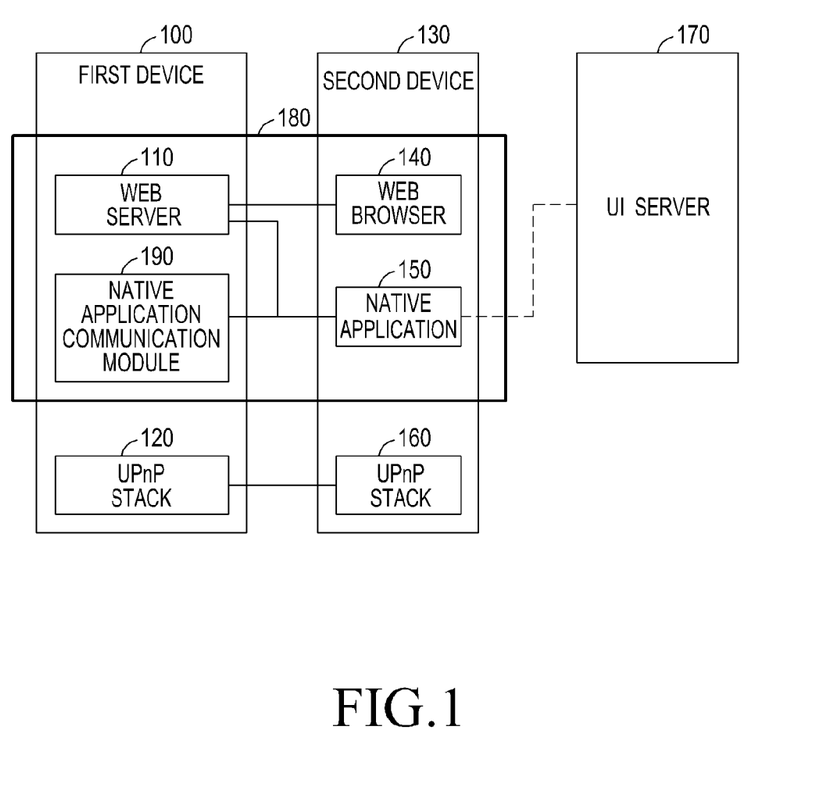
FIG. 1 is a block diagram illustrating an internal structure for communication between an automobile head unit and a mobile device according to an embodiment of the present invention.

The aforementioned operation will be described with reference to FIG. 1. FIG. 1 illustrates an architecture and an interface in which a web application may be used together with a native application in communication between a first device and a second device according to an embodiment of the present invention. While the present invention is described based on an example that the first device is an automobile head unit and the second device is a mobile device, if the first device is a mobile device, the second device is an automobile head unit. The first device 100 includes a web server 110 capable of providing the second device 130 with a web application and a Universal Plug and Play (UPnP) stack 120.

The web server 110 communicates with the web application transmitted to the second device 130. Further, the UPnP stack 120 included in the first device 100 may search for a neighboring second device and transfers information on services provided by the first device 100 to the second device 130. The information on the services may be described in a response to a UPnP action or a device description to be provided as described below.

The second device 130 has a web browser 140 capable of receiving a web application from the first device 100 and displaying the received web application to a user.

Further, the second device 130 has a native application 150 capable of communicating with the web server 110 of the first device 100 when the web server 100 of the first device 100 is not able to provide the web application. In addition, the native application 150 may communicate with a native application communication module 190, not with the web server 110, based on an autonomously regulated protocol and interface.

Further, the second device 130 also includes a UPnP stack 160, and the UPnP stack 160 may search for the first device 100 and make a request to the first device 100 for a service list of the first device 100. Information on the service list received from the first device 100 may be entirely or partially transferred to the web application within the web browser 140 or the native application 150.

A User Interface (UI) server 170 transfers a profile for a user interface expressible in the native application 150 when the native application 150 demands a user interface for communication with the first device 100. The UI server 170 is a logical module, and may exist inside the first device 100 or second device 130, or may be a third external server, not inside either the first device 100 or the second device 130.

According to the aforementioned structure, although the first device 100 provides the web user interface, and the second device 130 or a third server, e.g. the UI server 170, connected to the second device 130, provides the native application user interface, the web user interface and the native application user interface may be used together.

Hereinafter, a method for transmitting information on the web application provided to the second device 130 by the first device 100, a method for analyzing the transmitted information and selecting and executing an appropriate web application or native application by the second device 130, and a method for communicating between the first device 100 and the executed application will be described with reference to FIG. 2.

Figure 2:
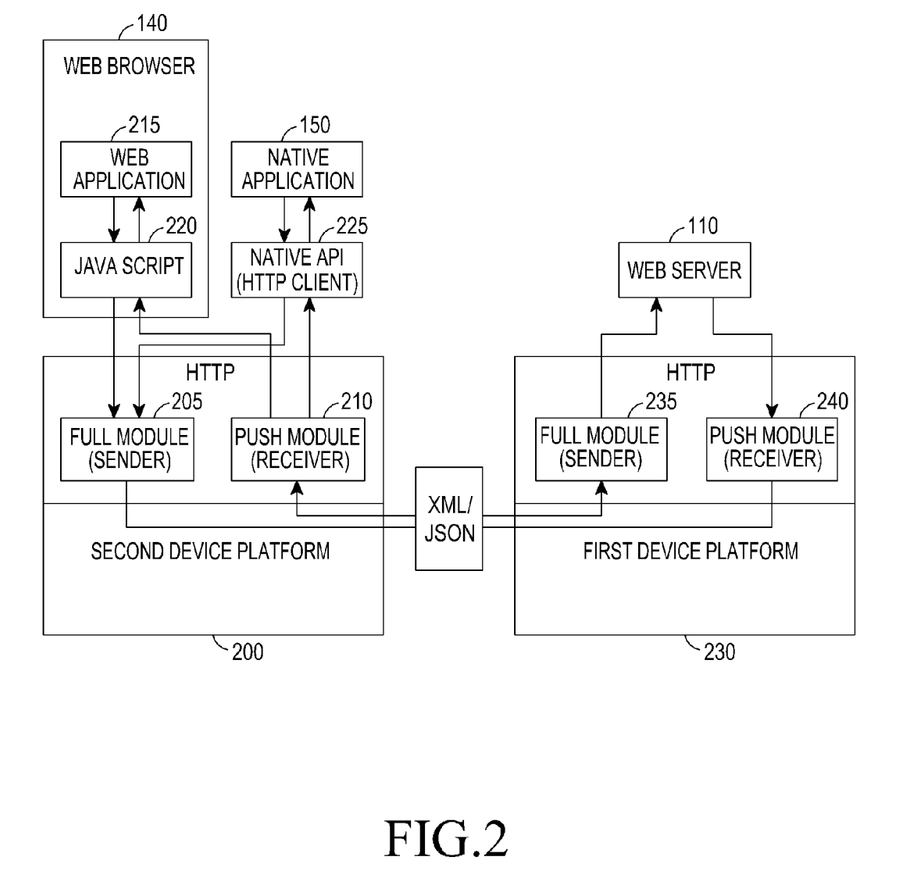
FIG. 2 is a block diagram specifically illustrating communication between a web application executed in a web server and a web browser and a native application executed in a second device of FIG. 1.

FIG. 2 is a block diagram specifically illustrating a communication process between a web application executed in the web server and the web browser and the native application executed in the second device of FIG. 1.

First, the second device 130 includes a second device platform 200, and the second device platform 200 supports HTTP protocol communication. An HTTP protocol module supporting HTTP protocol communication includes a pull module (sender) 205 capable of transferring information to the first device 100 and a push module (receiver) 210 capable of receiving information from the first device 100.

Further, the second device 130 includes the web browser 140, and the web browser 140 executes a web application 215 received from the web server 110 of the first device 100. The web application 215 transfers an HTTP request message through the pull module (sender) 205 of the HTTP protocol module via a Java script 220 engine of the web browser 140 to the first device 100.

Further, the native application 150 executed in the second device 130 handles the HTTP protocol through a native API 225 of an HTTP client module provided in the second device platform 200. Here, the native API 225 transfers content of a request made in the native application 150 to the web server 110 of the first device 100 through the pull module 205 of the HTTP protocol communication. Information may be transferred or requested to the web server 110 within the first device 100 through the request message based on an HTTP header message, such as GET, POST, PUT, and DELETE messages.

When the first device 100 desires to push the information to the web application or native application 150 executed in the second device 130, respectively, the information is generally pushed through a web socket scheme or a server event scheme provided in the HTML5. The HTTP client module in the second device 130 essentially includes the native API 225 capable of receiving information that the web server 110 desires to push with a push scheme.

Figure 6:
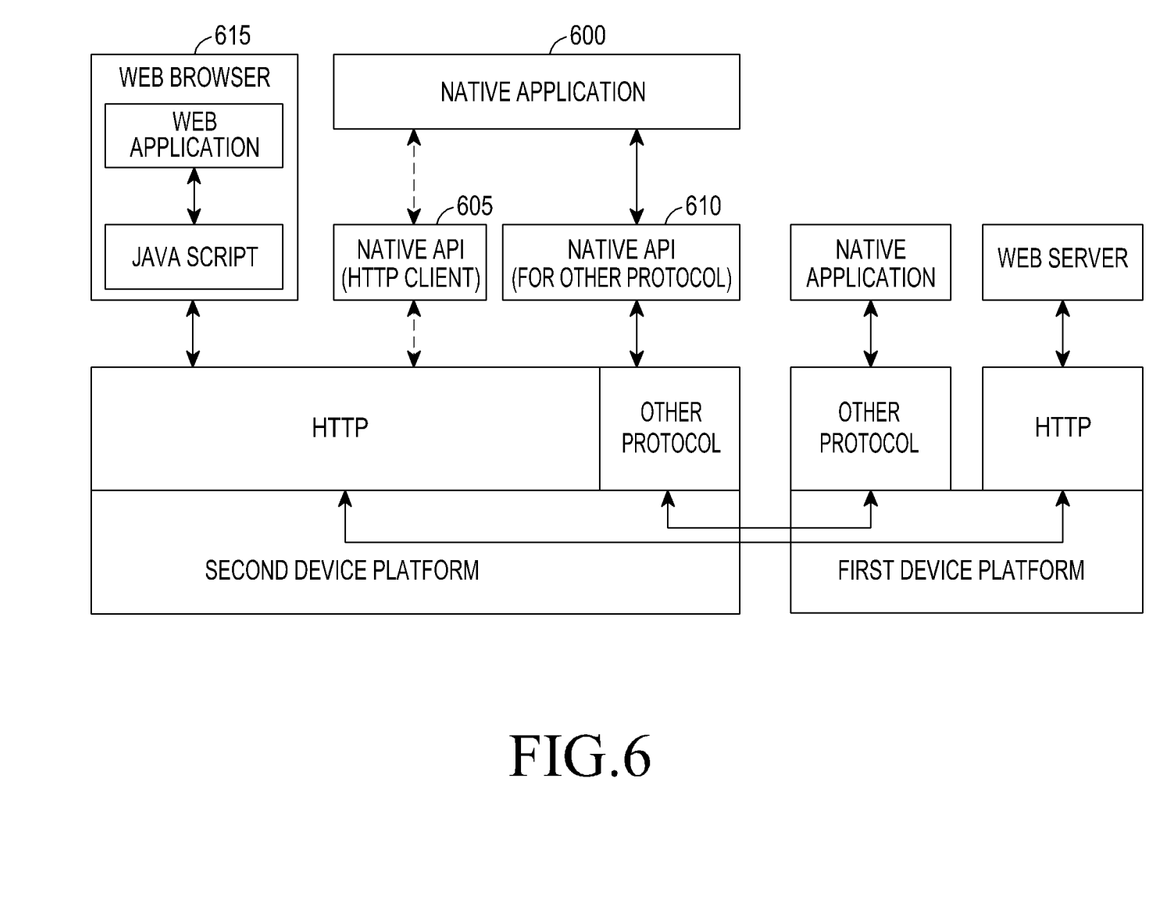
FIG. 6 is a block diagram specifically illustrating communication using a native application between a first device and a second device according to an embodiment of the present invention.

As discussed below, communication between the first device and the second device by using the native application according to another embodiment of the present invention is illustrated in FIG. 6.

FIG. 6 illustrates an example in which the native application 600 performs communication by using a native API 605 for HTTP and using a different native API 610 for a different specific protocol. The remaining elements including the web browser 615 operate identically to those of FIG. 2.

Figure 3:
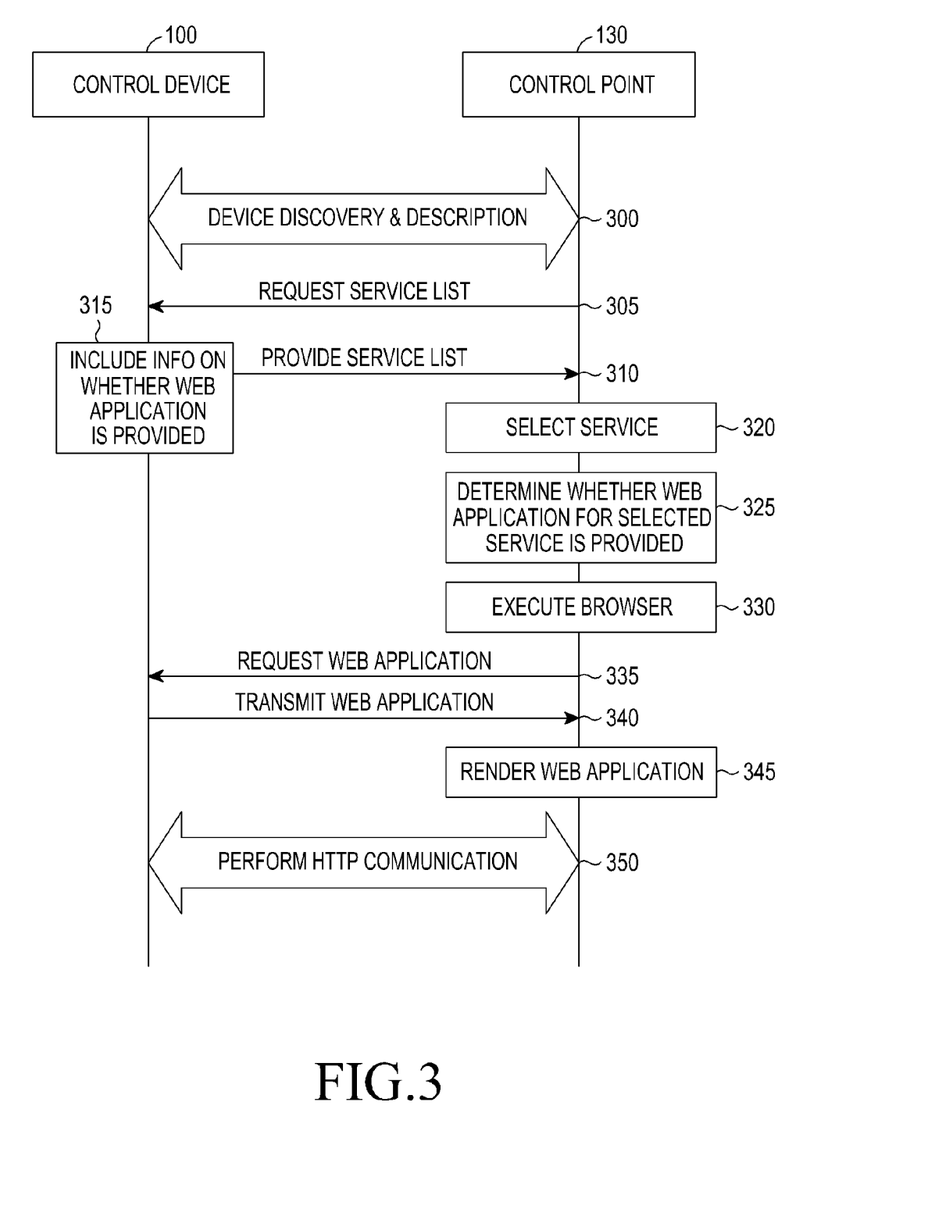
FIG. 3 is a flow diagram illustrating a process of providing a web application to a control point by a control device according to an embodiment of the present invention.

FIG. 3 is a flow diagram illustrating a process of providing a control point with a web application including a user interface by a control device. FIG. 3 illustrates a process of providing the control point with a web application by the control device according to an embodiment of the present invention. Here, the control device corresponds to the first device and the control point corresponds to the second device.

As illustrated in FIG. 1, the control device and the control point include the UPnP stack. In FIG. 3, the control device 100 functions as a UPnP control device and the control point device 130 functions as a UPnP control point.

The control point 130 searches for the control device 100 through a device discovery and description action in step 300. The control point 130 makes a request for a service list to the found control device 100 in step 305. For the request of the service list, the control point 130 transmits "GetServiceList SOAP Action" message. The "SOAP Action" message is a message requesting the list of the services provided by the control device 100, and the control device 100 provides the control point 130 with the service list in response to the request message in step 310. The control device 100 transfers "A_ARG_TYPE_ServiceList" message for the provision of the service list. The service list includes information on whether the web application is provided in step 315.

Figure 5:
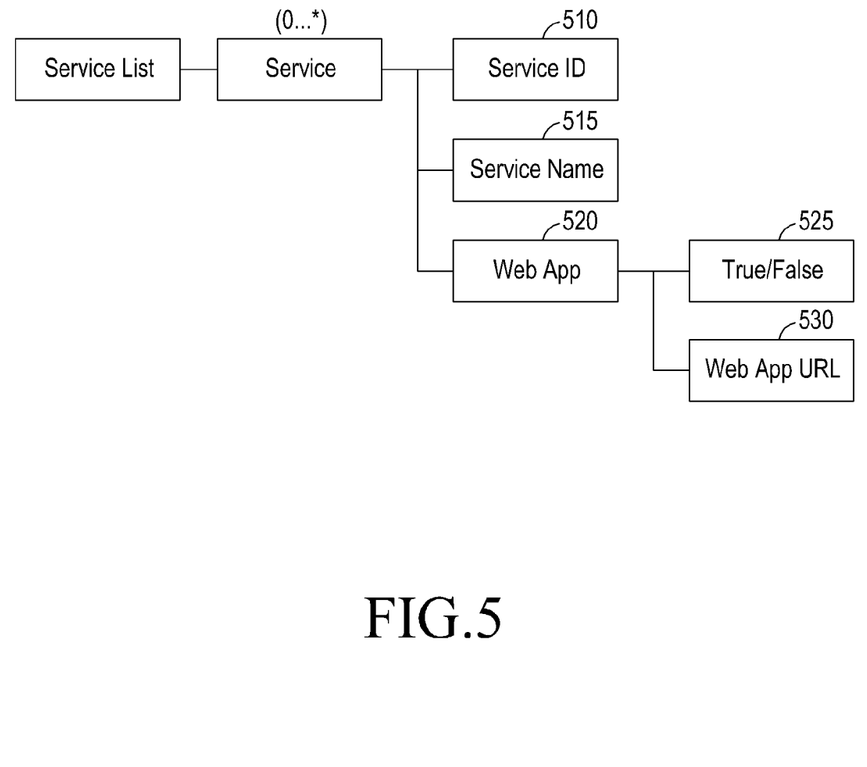
FIG. 5 is a block diagram illustrating information on a service list provided by a control device according to an embodiment of the present invention.

The service list generally contains the respective services as illustrated in FIG. 5, and the respective services may provide a service ID 510, a service name 515, information 525 on whether the control device 100 may provide the web application 520 for the service, and a URL address 530 accessible to the web application for the service when the control device 100 is able to provide the web application 520.

An element related to the information 525 on whether the control device 100 is able to provide the web application 520 for the service may be expressed in a different manner. When the service list includes the URL address 530 accessible to the web application 520 for the service, the element may be considered that the control device 100 may provide the web application, so that the information 525 may be omitted depending on the implementation.

The control point 130 receiving the information on the service list displays a screen such that a user may select a desired service in the service list. Accordingly, the user of the control point 130 may select one service in the service list.

When the service is selected in step 320, the control point 130 determines whether the selected service may provide the web application based on information on the service list in step 325. That is, the control point 130 determines whether the web application for the selected service is provided.

If the control point 130 receives the web application from the control device 100, the control point 130 extracts URL information on the web application from the information on the service list as illustrated in FIG. 5. Then, the control point 130 executes the web browser 140 set as a default therein in step 330. According to the execution of the web browser, the control point 130 transfers the extracted URL information to the web browser 140, and the web browser 140 makes a request for the web application to the web server 110 of the control device 100 and receives the requested web application from the web server 110 of the control device 100 in steps 335 and 340. Next, the control point 130 renders the web application and executes the web application in the web browser 140 in step 345. Accordingly, the executed web application is displayed to the user, and the control point 130 communicates with the control device 100 through the web application in step 350.

Figure 4:
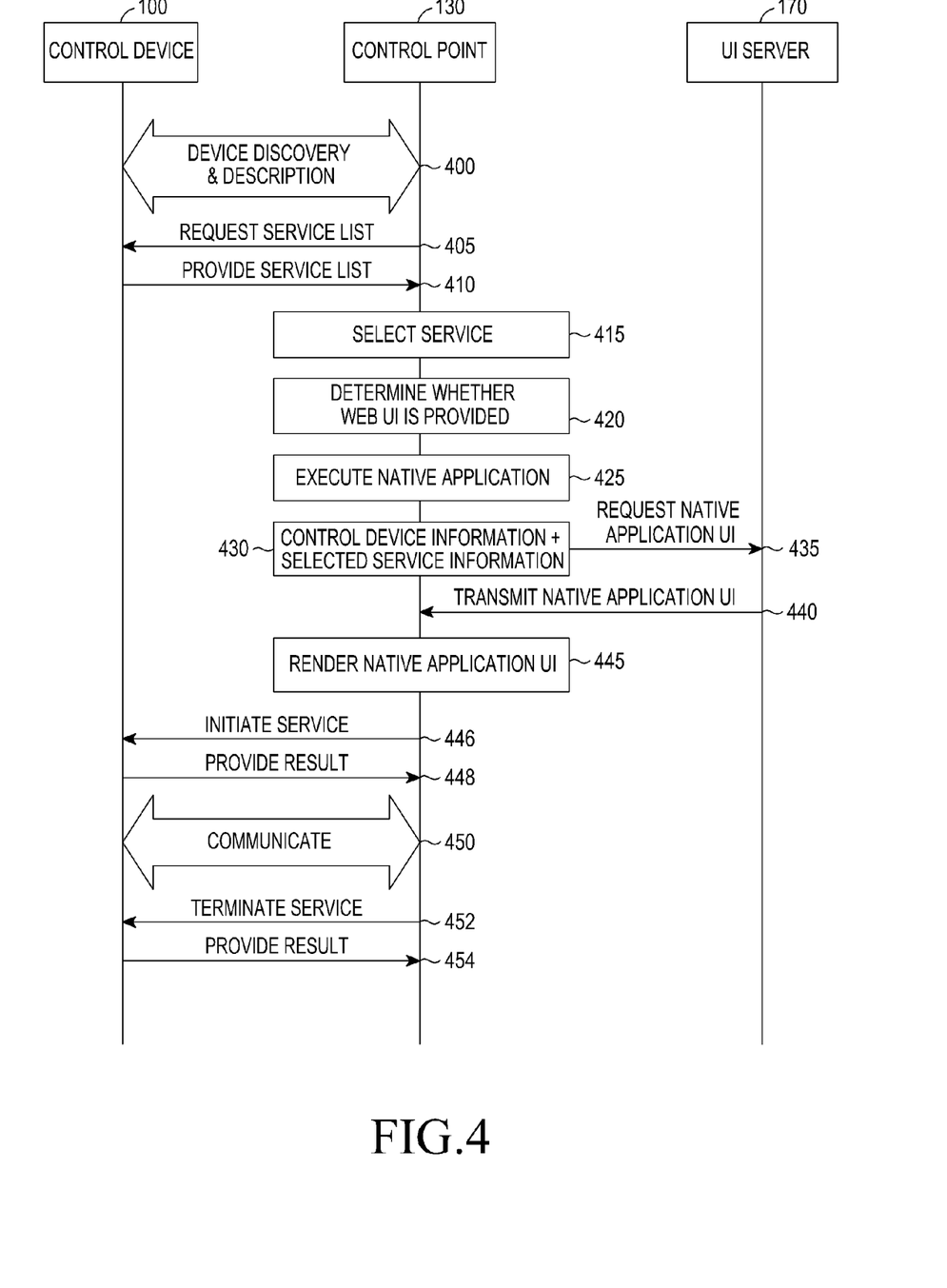
FIG. 4 is a flow diagram illustrating a process of receiving a native application user interface from a third user interface server by a control point according to an embodiment of the present invention.

Referring to FIG. 4, FIG. 4 illustrates a process of receiving a native application user interface from a third native user interface server by the control point according to another embodiment of the present invention. In FIG. 4, the control device and the control point include the UPnP stack, and the native user interface server functions as a native application user interface server similar to FIG. 3.

Referring to FIG. 4, steps 400 through 415 are the same as steps 300 through 315 of FIG. 4, so their detailed description will not be repeated. Accordingly, as described above with reference to FIG. 3, the control point device 130 receives the service list as shown in FIG. 5 provided by the control device 100 and the control point 130 displays the received service list such that the user may select any one service from the service list.

The control point 130 determines whether the selected service may provide the web application based on information on the received service list in step 420. That is, the control point 130 determines whether the web user interface is provided. If the control point 130 is not able to receive the web application from the control device 100, or desires to communicate with the control device 100 through the native application even though the control point 130 receives the web application from the control device 100, the control point 130 executes the native application related to the selected service in step 425.

Next, the executed native application transfers information on the selected service and information on the control device 100 providing the service to the user interface server 170 in step 430 and makes a request for a native application UI to the user interface server 170 in step 435. For example, the information on the control device 100 may be information such as <modelName> and <modelNumber> within the UPnP device description.

The user interface server 170 generates a native application UI based on the information of step 430 and transmits the generated native application UI in response to the request for the native application UI in step 440. Here, the user interface server 170 is a server for providing the native application user interface according to the execution of the native application.

The native application receiving the native application UI renders the native application UI in step 445. For communication between the control device 100 and the native application within the control point 130 for the selected service, a communication module within the control device 100 is executed.

If the communication module within the control device 100 is not executed in advance, the control point 130 instructs the service initiation in step 446. To this end, the control point 130 executes the communication module through transmitting a "StartService UPnP SOAP Action" message to the control device 100. In this case, a service ID 510, shown in FIG. 5, of the service to be executed in the service list received in step 410 is contained as a parameter of the "SOAP Action" message. When the "SOAP Action" message is transferred to the control device 100, the control device 100 executes other modules related to the service selected by the control point 130 together with the communication module 190. If it is not necessary to execute other related modules, the control device 100 may not execute the related modules. Then, the control device 100 provides a result corresponding to the transmission of the message to the control point 130 in step 448.

Figure 7:
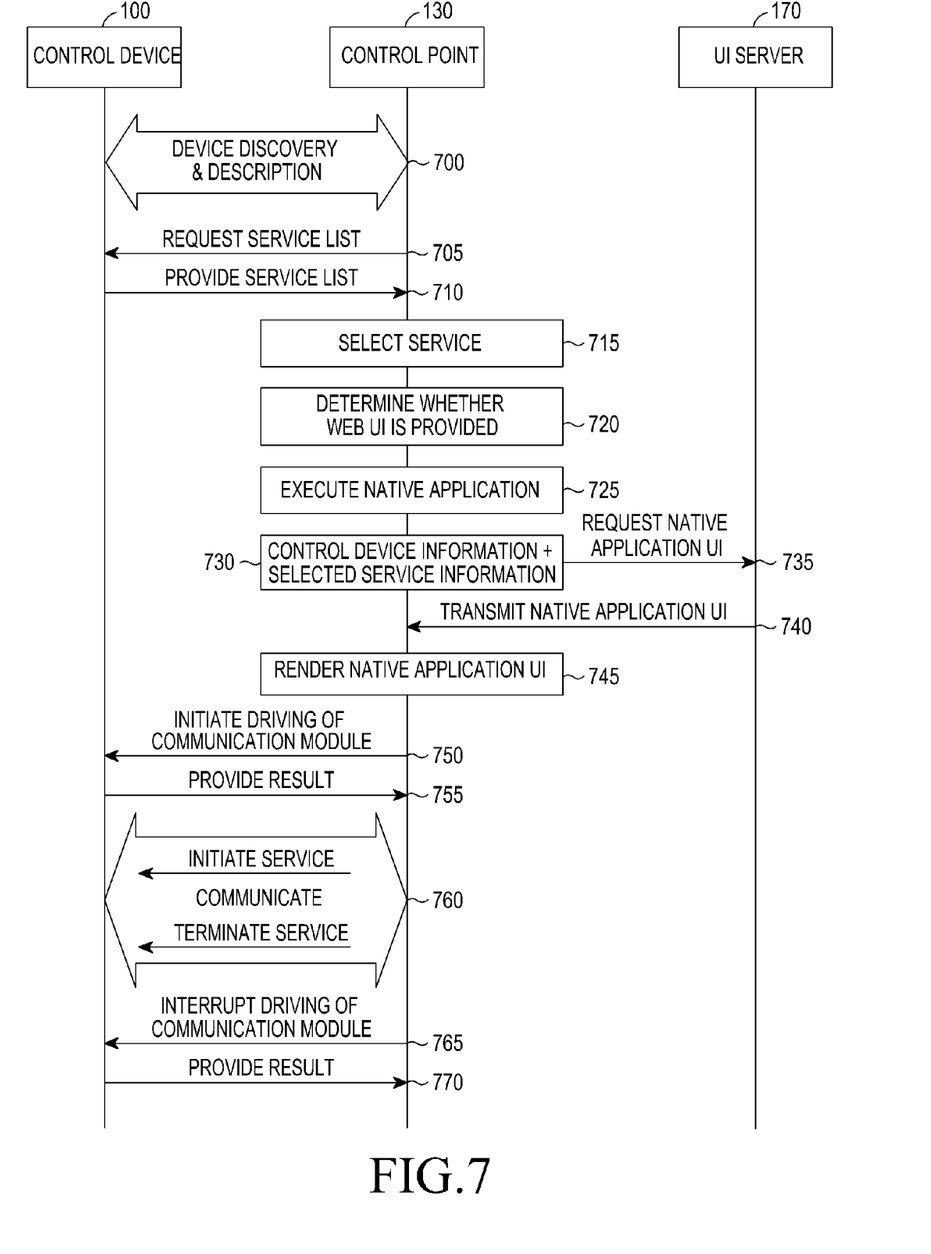
FIG. 7 is a flow diagram illustrating a process of receiving a native application user interface by a control point according to an embodiment of the present invention.

In the meantime, referring to FIG. 7, FIG. 7 illustrates a process of receiving the native application user interface by the control point device according to another embodiment of the present invention.

FIG. 7 describes an example of the execution of only the communication module 190 within the control device 100. Accordingly, a message instructing the initiation of the communication module may be transferred in step 750 of FIG. 7, instead of the "StartService UPnP SOAP Action" message in step 446 of FIG. 4. To this end, a "LaunchApplication UPnP SOAP Action" message may be used. Accordingly, an environment in which the native application 150 within the control point 130 may communicate with the communication module 190 through the "LaunchApplication UPnP SOAP Action" message may be established, and other modules related to the selected service may be executed within the control device 100 through an autonomous protocol and interface, i.e. the native API 610, set in the communication module.

Accordingly, the control point 130 may communicate in step 450 with the control device 100 through the native application 150 that renders the native application UI. When the control point 130 determines it is not necessary to perform the selected service any longer, the control point 130 instructs the stoppage of the service in step 452. For the instruction of the service stoppage, a "StopService UPnP SOAP Action" message is used. The "StopService UPnP SOAP Action" message may stop not only the communication module but also other modules related to the service to be stopped. In this case, the service ID 510 of the service to be stopped in the service list received in step 410 is inserted as a parameter of the "SOAP Action" message as shown in FIG. 5. Then, the control device 100 provides the control point 130 with a result in response to the transmission of the message for the service stoppage in step 454.

Referring back to FIG. 7, a message for stoppage of only a driving of the communication module 150 may be transmitted, instead of the message for the service interruption of FIG. 4. Accordingly, the control point 130 may stop other selected service-related modules currently executed in the control device 100 through the autonomous protocol and interface set in the communication module 150. Then, the control point 130 may transmit a message for termination of the driving of the communication module in step 765. To this end, the control point 130 transmits a "TerminateApplication UPnP SOAP Action" message capable of terminating only the communication module 190 within the control device 100. The control point 130 receives a result in response to the transmission of the message for the termination of the driving of the communication module in step 770. As a result, the native application 150 within the control point 130 may stop the communication with the communication module 190.

According to the present invention, it is possible to simultaneously support a user interface through a web application provided by an automobile manufacturer and a user interface through a mobile application provided by a mobile device manufacturer during communication between an automobile head unit and a mobile device.

Accordingly, the present invention has an advantage of using different user interfaces together even though different devices provide the web user interface and the native application user interface, respectively.

Further, according to the present invention, it is possible to establish an environment in which a mobile platform can dynamically select and execute a web application and a mobile application for a single service depending on the situation.

While the present invention has been shown and described with reference to certain embodiments and drawings thereof, it will be understood by those skilled in the art that various changes in form and details may be made therein without departing from the spirit and scope of the present invention as defined by the appended claims.

What is claimed is:

1. A method for exchanging data with a control device by a control point device, the method comprising:
   transmitting a request for a service list, from the control point device, to the control device, if the control device is discovered;
   receiving, at the control point device, from the control device, the service list including information on whether a web application for at least one service is provided;
   determining, at the control point device, whether the control device is capable of providing a web application for a selected service in the service list based on the information of the service list;
   extracting a URL address accessible to the web application for the selected service from the service list based on the determination result, when the control device is capable of providing the web application;
   transmitting a request for the web application for the selected service, from the control point device, to a web server of the control device, through a web browser by using information on the extracted URL address;
   executing, at the control point device, the web application received from the control device; and
   based on determining that the control point device is not capable of receiving the web application for the selected service from the control device, executing a native application related to the selected service.

2. The method as claimed in claim 1, wherein the control point device and the control device are a mobile device and an automobile head unit, respectively.

3. The method as claimed in claim 1, wherein the service list contains at least one of an ID of the at least one service, a name of the at least one service, and a URL address accessible to the web application for the at least one service.

4. The method as claimed in claim 1, further comprising driving the web browser in response to receiving the service list.

5. The method as claimed in claim 1, wherein, in transmitting the request for the service list, the request for the service list is transferred to the control device through a UPnP stack included in the control point device.

6. The method as claimed in claim 1, further comprising communicating with the web server of the control device through the web application.

7. The method as claimed in claim 1, further comprising:
   transmitting a request for a native application UI for communicating with a web server of the control device through the native application to a UI server; and
   if the native application UI is received from the UI server, rendering the native application UI and transmitting an instruction for driving of a communication module of the control device through the native application.

8. The method as claimed in claim 7, further comprising, after rendering of the native application UI, communicating with the web server through the communication module within the control device.

9. The method as claimed in claim 7, wherein the instruction includes a service ID of the selected service.

10. The method as claimed in claim 7, further comprising transmitting a message for termination of the driving of the communication module of the control device, the message including a service ID of a service to be terminated in response to a request for termination of the service.

11. A control point device for exchanging data with a control device, the control point device comprising:
   a UPnP stack for discovering a neighboring control device, transmitting a request for a service list to the control device if the neighboring control device is discovered, and receiving the service list including information on whether a web application for at least one service is provided from the control device; and
   a web browser for receiving the service list from the UPnP stack, determining if the web application for the at least one service selected in the service list can be provided based on the information of the service list, extracting a URL address accessible to the web application for the selected service from the service list based on the determination result when the web application can be provided, transmitting a request for the web application for the selected service to a web server of the control device by using information on the extracted URL address, and executing the web application received from the control device;
   wherein a native application is executed if the control point device cannot receive the web application for the selected service from the control device.

12. The control point device as claimed in claim 11, wherein the web browser determines if the control device can provide the web application for the selected service with reference to information on whether a web application for at least one service included in the service list is provided.

13. The control point device as claimed in claim 11, wherein the control point device and the control device are a mobile device and an automobile head unit, respectively.

14. The control point device as claimed in claim 11, wherein the service list contains at least one of an ID of the at least one service, a name of the at least one service, and a URL address accessible to the web application for the at least one service.

15. The control point device as claimed in claim 11, wherein the web browser is driven in response to receiving the service list.

16. The control point device as claimed in claim 11, wherein the executed web application is used for communication with the web server of the control device.

17. The control point device as claimed in claim 11, wherein the native application is related to the selected service, transmits a request for a native application UI for communication with the web server of the control device to a UI server, and transmits an instruction for driving of a communication module of the control device by rendering the native application UI if the native application UI is received from the UI server.

18. The control point device as claimed in claim 17, wherein the native application communicates with the web server through the communication module within the control device after rendering of the native application UI.

19. The control point device as claimed in claim 17, wherein the native application transmits a message for termination of the driving of the communication module of the control device, the message including a service ID of a service to be terminated in response to a request for termination of the service.

20. A method for exchanging data with a control point device by a control device, the method comprising:
   receiving, at the control device, from the control point device, a request for a service list;
   transmitting, from the control device, to the control point device, the service list including a URL address accessible to a web application for at least one service;
   receiving, at the control device, from the control point device, a request for a web application for a selected service from the service list by using information on a URL address for the selected service from the service list, when the control point device determines that the control device is capable of providing the web application;
   transmitting, from the control device, to the control point device, the web application for the selected service; and
   determining whether the control point device is not capable of receiving the web application for the selected service from the control device.

21. The method as claimed in claim 20, wherein the selected service is determined based on information of the service list in the control point device.

22. The method as claimed in claim 21, wherein the request for web application for the selected service is received from control point device upon determination that the web application for the selected service by the control device can be provided.

23. The method as claimed in claim 20, wherein the control point device and the control device are a mobile device and an automobile head unit, respectively.

24. The method as claimed in claim 20, wherein the service list further includes at least one of an ID of the at least one service, and a name of the at least one service.

25. A control device for exchanging data with a control point device, the control device comprising:
   a UPnP stack for discovering a neighboring control point device, receiving a request for a service list from the control point device if the neighboring control point device is discovered, and transmitting the service list including a URL address accessible to a web application for at least one service; and
   a web server for transmitting a web application for a selected service to the control point device if a request for the web application for the selected service from the service list is received by using information on a URL address for the selected service upon determining that the control device is capable of providing the web application by the control point device, communicating with the web application transmitted to the control point device; and determining whether the control point device is not capable of receiving the web application for the selected service from the control device.

26. The control device as claimed in claim 25, wherein the selected service is determined based on information of the service list in the control point device.

27. The control device as claimed in claim 26, wherein the request for web application for the selected service is received from control point device upon determination that the web application for the selected service by the control device can be provided.

28. The control device as claimed in claim 25, wherein the control point device and the control device are a mobile device and an automobile head unit, respectively.

29. The control device as claimed in claim 25, wherein the service list further includes at least one of an ID of the at least one service, and a name of the at least one service.

* * * * *